United States Patent
Kumahashi et al.

(10) Patent No.: US 12,202,692 B2
(45) Date of Patent: Jan. 21, 2025

(54) MEDIUM CONVEYING APPARATUS INCLUDING A FIRST CONVEYANCE GUIDE TO MOVE IN CONJUNCTION WITH MOVEMENT OF ROLLER AND A SECOND CONVEYANCE GUIDE TO REGULATE THE FLOATING OF A CONVEYED MEDIUM

(71) Applicant: PFU LIMITED, Kahoku (JP)

(72) Inventors: Tomofumi Kumahashi, Kahoku (JP); Seiki Awazu, Kahoku (JP); Takayuki Mori, Kahoku (JP)

(73) Assignee: PFU LIMITED, Kahoku (JP)

( * ) Notice: Subject to any disclaimer, the term of this patent is extended or adjusted under 35 U.S.C. 154(b) by 0 days.

(21) Appl. No.: 18/497,906

(22) Filed: Oct. 30, 2023

(65) Prior Publication Data

US 2024/0059511 A1 Feb. 22, 2024

Related U.S. Application Data

(63) Continuation of application No. 17/450,953, filed on Oct. 14, 2021, now Pat. No. 11,834,285.

(30) Foreign Application Priority Data

Nov. 30, 2020 (JP) .................. 2020-198607

(51) Int. Cl.
 *H04N 1/04* (2006.01)
 *B65H 3/06* (2006.01)
 (Continued)

(52) U.S. Cl.
 CPC ........... *B65H 3/0661* (2013.01); *B65H 5/062* (2013.01); *B65H 5/36* (2013.01); *H04N 1/00615* (2013.01);
 (Continued)

(58) Field of Classification Search
 CPC ............ B65H 2220/01; B65H 2220/08; B65H 2220/11; B65H 2404/144; B65H 2404/63;
 (Continued)

(56) References Cited

U.S. PATENT DOCUMENTS

2005/0254103 A1 11/2005 Sugiyama et al.
2009/0231643 A1 9/2009 Tan et al.
(Continued)

FOREIGN PATENT DOCUMENTS

JP 2005-328216 A 11/2005
JP 2020-102696 A 7/2020

*Primary Examiner* — Chad Dickerson
(74) *Attorney, Agent, or Firm* — LEWIS ROCA ROTHGERBER CHRISTIE LLP

(57) ABSTRACT

A medium conveying apparatus includes an imaging unit provided to be movable in a direction perpendicular to a conveying surface for conveying a medium, to image the medium, a roller pair provided on an upstream side of the imaging unit in a medium conveying direction, the roller pair including a first roller provided to be movable in a direction perpendicular to the conveying surface, and a second roller facing the first roller, and a conveyance guide provided on a rotation shaft of the first roller, to move in conjunction with a movement of the first roller. The conveyance guide includes a guide surface extending at least from a downstream end portion of a nip portion of the roller pair to an upstream end portion of the imaging unit in the medium conveying direction and being flush with a lower surface of the imaging unit.

6 Claims, 9 Drawing Sheets

(51) Int. Cl.
  *B65H 5/06*    (2006.01)
  *B65H 5/36*    (2006.01)
  *H04N 1/00*    (2006.01)
  *H04N 1/12*    (2006.01)

(52) U.S. Cl.
  CPC ....... *H04N 1/00716* (2013.01); *H04N 1/1225* (2013.01); *B65H 2404/144* (2013.01); *B65H 2511/13* (2013.01); *B65H 2801/39* (2013.01)

(58) Field of Classification Search
  CPC ............ B65H 2511/13; B65H 2511/20; B65H 2511/224; B65H 2801/39; B65H 3/0661; B65H 5/062; B65H 5/36; H04N 1/00615; H04N 1/00716; H04N 1/1215; H04N 1/1225
  USPC ........................................ 358/408, 471, 474
  See application file for complete search history.

(56) References Cited

U.S. PATENT DOCUMENTS

| | | |
|---|---|---|
| 2014/0063573 A1 | 3/2014 | Yonemura et al. |
| 2014/0079460 A1 | 3/2014 | Kanaya |
| 2020/0036855 A1 | 1/2020 | Nakamura |
| 2020/0198910 A1* | 6/2020 | Takato ............... H04N 1/00557 |
| 2020/0198916 A1* | 6/2020 | Shiraiwa ............... B65H 5/068 |

\* cited by examiner

MEDIUM CONVEYING APPARATUS INCLUDING A FIRST CONVEYANCE GUIDE TO MOVE IN CONJUNCTION WITH MOVEMENT OF ROLLER AND A SECOND CONVEYANCE GUIDE TO REGULATE THE FLOATING OF A CONVEYED MEDIUM

CROSS-REFERENCE TO RELATED APPLICATIONS

This application is a continuation application of U.S. patent application Ser. No. 17/450,953, filed Oct. 14, 2021, which claims priority to and benefit of prior Japanese Patent Application No. 2020-198607, filed on Nov. 30, 2020, the entire contents of which are incorporated herein by reference.

TECHNICAL FIELD

Embodiments discussed in the present specification relate to medium conveyance.

BACKGROUND

A medium conveying apparatus such as a scanner device to image media while conveying the media is required to satisfactorily image the media with various thicknesses. Accordingly, a medium conveying apparatus in which an imaging unit to image the media is located movably according to a thickness of a conveyed medium has been developed.

An image reading device in which driven rollers being a pair of upstream and downstream rollers are configured to be vertically movable, and roller shafts of the rollers come into contact from below with a receiving part protruding from an image reading unit is disclosed (see Japanese Unexamined Patent Application Publication (Kokai) No. 2005-328216). When a sheet material is held by at least either of conveyance nips of the pair of upstream or downstream rollers in the image reading device, an image reading unit is pushed up by the roller shaft, and a width of an image reading gap is kept equivalent to the thickness of the sheet material.

A medium conveying apparatus including an imaging unit located movably in a direction perpendicular to a medium conveying direction, a roller located movably in the direction perpendicular to the medium conveying direction, and a conveyance guide provided integrally with the imaging unit is disclosed (see Japanese Unexamined Patent Application Publication (Kokai) No. 2020-102696). The medium conveying apparatus includes a moving member to move in conjunction with a movement of the roller, and engage with an engaging member provided integrally with the imaging unit, to move the imaging unit.

SUMMARY

According to some embodiments, a medium conveying apparatus includes an imaging unit provided to be movable in a direction perpendicular to a conveying surface for conveying a medium, to image the medium, a roller pair provided on an upstream side of the imaging unit in a medium conveying direction, the roller pair including a first roller provided to be movable in a direction perpendicular to the conveying surface, and a second roller facing the first roller, and a conveyance guide provided on a rotation shaft of the first roller, to move in conjunction with a movement of the first roller. The conveyance guide includes a guide surface extending at least from a downstream end portion of a nip portion of the roller pair to an upstream end portion of the imaging unit in the medium conveying direction and being flush with a lower surface of the imaging unit.

DESCRIPTION OF EMBODIMENTS

It is to be understood that both the foregoing general description and the following detailed description are exemplary and explanatory, and are not restrictive of the invention, as claimed.

Hereinafter, a medium conveying apparatus according to an embodiment, will be described with reference to the drawings. However, it should be noted that the technical scope of the invention is not limited to these embodiments, and extends to the inventions described in the claims and their equivalents.

Figure 1:
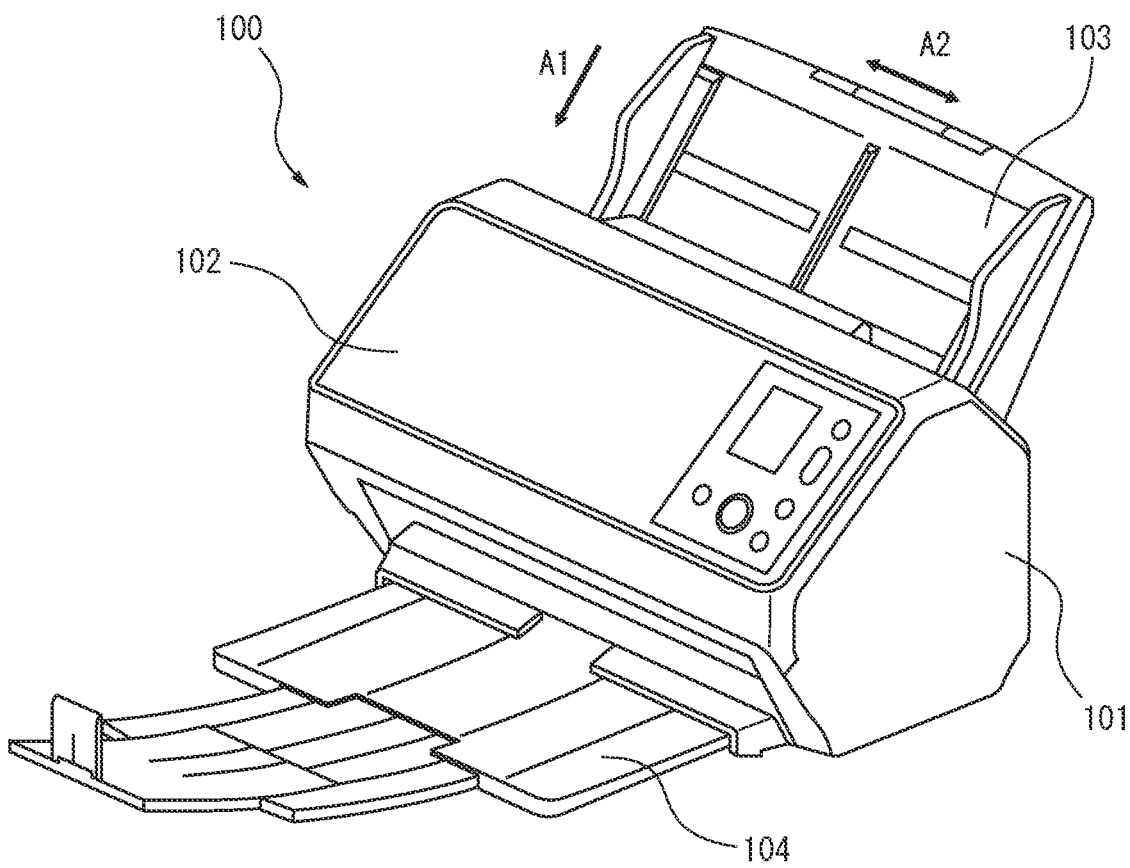
FIG. 1 is a perspective view illustrating a medium conveying apparatus 100 according to an embodiment.

FIG. 1 is a perspective view illustrating a medium conveying apparatus 100 configured as an image scanner. The medium conveying apparatus 100 conveys and images a medium being a document. The medium is a paper, a thick paper, a plastic card, a passport or a booklet, etc. The medium conveying apparatus 100 may be a fax machine, a copying machine, a multifunctional peripheral (MFP), etc.

The medium conveying apparatus 100 includes a lower housing 101, an upper housing 102, a medium tray 103, and an ejection tray 104, etc.

The upper housing 102 is located in a position covering a top surface of the medium conveying apparatus 100, and is engaged with the lower housing 101. The medium tray 103 is engaged with the lower housing 101 in such a way as to be able to place a medium to be conveyed. The ejection tray 104 is engaged with the lower housing 101 in such a way as to be able to hold an ejected medium. An arrow A1 in FIG. 1 indicates a medium conveying direction. An upstream hereinafter refers to an upstream in the medium conveying direction A1, and a downstream refers to a downstream in the medium conveying direction A1. An arrow A2 indicates a width direction perpendicular to the medium conveying direction A1.

Figure 2:
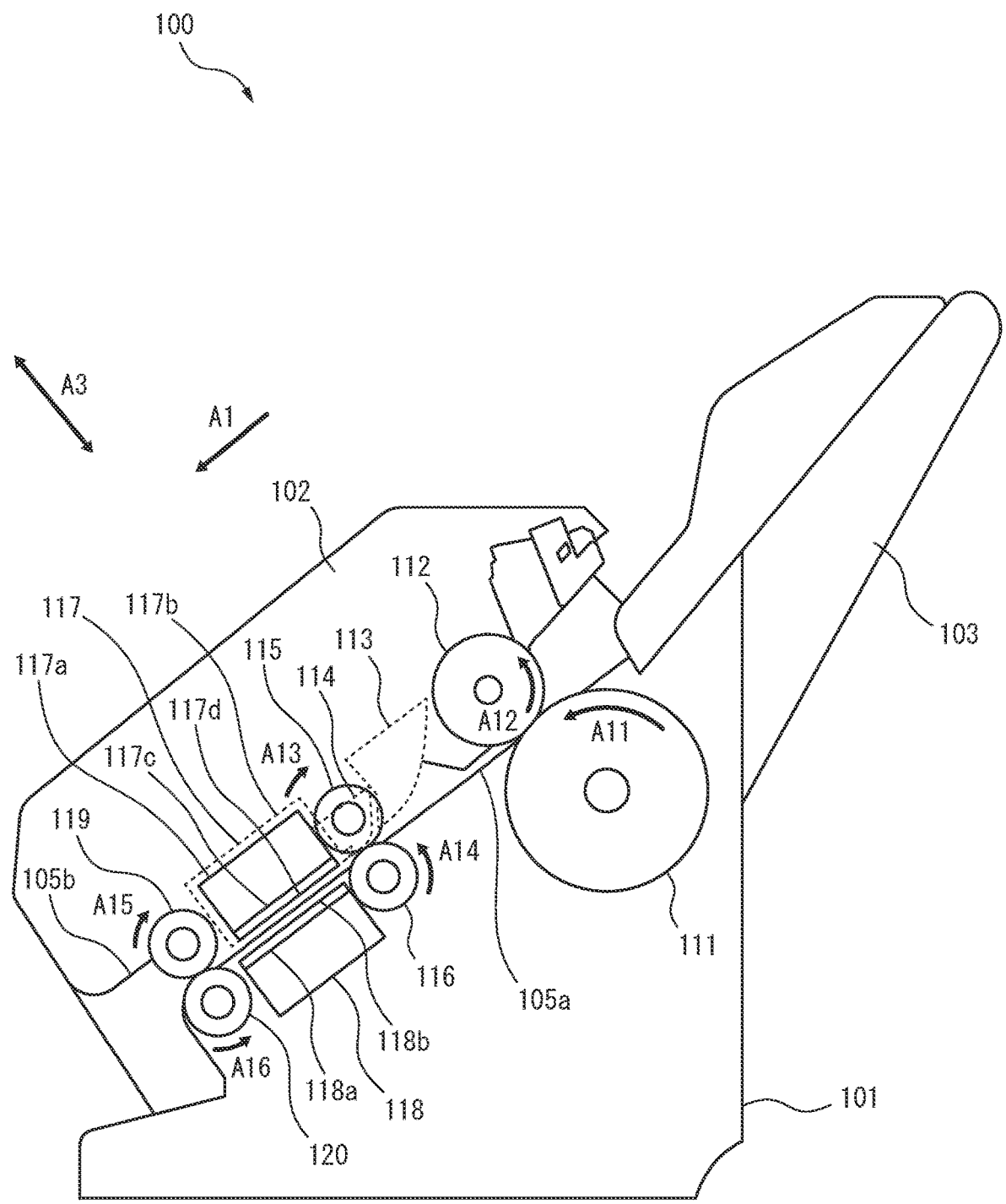
FIG. 2 is a diagram for illustrating a conveyance path inside the medium conveying apparatus 100.

FIG. 2 is a diagram for illustrating a conveyance path inside the medium conveying apparatus 100.

The conveyance path inside the medium conveying apparatus 100 includes a feed roller 111, a brake roller 112, a flap guide 113, a conveyance guide 114, a first conveyance roller 115, a second conveyance roller 116, a first imaging unit 117, a second imaging unit 118, a first ejection roller 119 and a second ejection roller 120, etc. The number of each roller is not limited to one, and may be plural.

A top surface of the lower housing 101 forms a lower guide 105a of a conveyance path of a medium, and a bottom surface of the upper housing 102 forms an upper guide 105b of the conveyance path of a medium. The lower guide 105a or the upper guide 105b is an example of a conveying surface for conveying the medium.

The feed roller 111 is provided on the lower housing 101 and sequentially feed media placed on the medium tray 103 from the lower side. The brake roller 112 is provided in the upper housing 102 and is located to face the feed roller 111.

The flap guide 113 is an example of a third conveyance guide, and is located between the feed roller 111 and the brake roller 112, and the first conveyance roller 115 and the second conveyance roller 116, in particular on the upstream side of the conveyance guide 114, in the medium conveying direction A1. The flap guide 113 guides the front end of the medium fed by the feed roller 111 and the brake roller 112 to a nip position of the first conveyance roller 115 and the second conveyance roller 116.

The conveyance guide 114 is provided at a position facing the second conveyance roller 116, i.e., on the downstream side of the flap guide 113. The conveyance guide 114 guides the front end of the medium fed by the feed roller 111 and the brake roller 112 and guided by the flap guide 113 to the nip position of the first conveyance roller 115 and the second conveyance roller 116. Further, the conveyance guide 114 guides the front end of the medium conveyed by the first conveyance roller 115 and the second conveyance roller 116, between the first imaging unit 117 and the second imaging unit 118.

The first conveyance roller 115 and the second conveyance roller 116 are an example of a roller pair, and are provided on the downstream side of the feed roller 111 and the brake roller 112 and on the upstream side of the first imaging unit 117 and the second imaging unit 118 in the medium conveying direction A1. The first conveyance roller 115 is an example of a first roller, and is provided in the upper housing 102. On the other hand, the second conveyance roller 116 is an example of a second roller, and is provided to face the first conveyance roller 115 in the lower housing 101.

The first imaging unit 117 is an example of an imaging unit, and is provided on the upper housing 102. The first imaging unit 117 includes an imaging unit housing 117a and an imaging unit guide 117b. A first transmissive member 117c is provided in a lower portion of the imaging unit housing 117a. The first transmissive member 117c is formed of transparent glass, plastic, etc., and a lower surface 117d of the first transmissive member 117c guides an upper surface of the conveyed medium.

The first imaging unit 117 includes a line sensor based on a unity-magnification optical system type contact image sensor (CIS) including an imaging element based on a complementary metal oxide semiconductor (CMOS) linearly located in a main scanning direction, in the imaging unit housing 117a. The first imaging unit 117 includes a lens for forming an image on the imaging element, and an analog-digital (A/D) converter for amplifying and analog-digital (A/D) converting an electric signal output from the imaging element, in the imaging unit housing 117a. The first imaging unit 117 generates and outputs an input image imaging a back surface of a conveyed medium, in accordance with control from a processing circuit (not shown).

The imaging unit guide 117b is an example of a second conveyance guide, and is provided on the outside of the upstream side of the imaging unit housing 117a and on the downstream side of the conveyance guide 114. The imaging unit guide 117b guides the front end of the medium conveyed by the first conveyance roller 115 and the second conveyance roller 116, and guided by the conveyance guide 114, between the first imaging unit 117 and the second imaging unit 118.

The second imaging unit 118 is provided to face the first imaging unit 117 in the lower housing 101. A second transmissive member 118a is provided in an upper portion of the second imaging unit 118. The second transmissive member 118a is formed of transparent glass, plastic, etc., and an upper surface 118b of the second transmissive member 118a guides a lower surface of the conveyed medium.

The second imaging unit 118 includes a line sensor based on a unity-magnification optical system type CIS including an imaging element based on a CMOS linearly located in a main scanning direction. The second imaging unit 118 includes a lens for forming an image on the imaging element, and an A/D converter for amplifying and A/D converting an electric signal output from the imaging element. The second imaging unit 118 generates and outputs an input image imaging a front surface of the conveyed medium, in accordance with control from the processing circuit.

The second imaging unit 118 may be omitted. Further, a line sensor based on a unity-magnification optical system type CIS including an imaging element based on charge coupled devices (CCDs) may be used in place of the line sensor based on a unity-magnification optical system type CIS including an imaging element based on a CMOS. Further, a line sensor based on a reduction optical system type line sensor including an imaging element based on CMOS or CCDs.

The first ejection roller 119 and the second ejection roller 120 are provided on the downstream side of the first imaging unit 117 and the second imaging unit 118 in the medium conveying direction A1. The first ejection roller 119 is provided in the upper housing 102. On the other hand, the second ejection roller 120 is provided to face the first ejection roller 119 in the lower housing 101.

The medium mounted on the medium tray 103 is conveyed between the lower guide 105a and the flap guide 113 in the medium conveying direction A1 by the feed roller 111 rotating in a direction of an arrow A11 in FIG. 2. When the medium is conveyed, the brake roller 112 rotates in a direction of an arrow A12. By the workings of the feed roller 111 and the brake roller 112, when a plurality of media are placed on the medium tray 103, only a medium in contact with the feed roller 111, out of the media placed on the medium tray 103, is separated. Consequently, conveyance of a medium other than the separated medium is restricted (prevention of multi-feed).

The medium is fed between the first conveyance roller 115 and the second conveyance roller 116 while being guided by the lower guide 105a, the flap guide 113 and the conveyance guide 114. The medium is fed between the first imaging unit 117 and the second imaging unit 118 along the conveyance guide 114 and the imaging unit guide 117b by the first conveyance roller 115 and the second conveyance roller 116 rotating in directions of an arrow A13 and an arrow A14, respectively. The medium read by the first imaging unit 117 and the second imaging unit 118 is ejected on the ejection tray 104 by the first ejection roller 119 and the second ejection roller 120 rotating in directions of an arrow A15 and an arrow A16, respectively.

Figure 3:
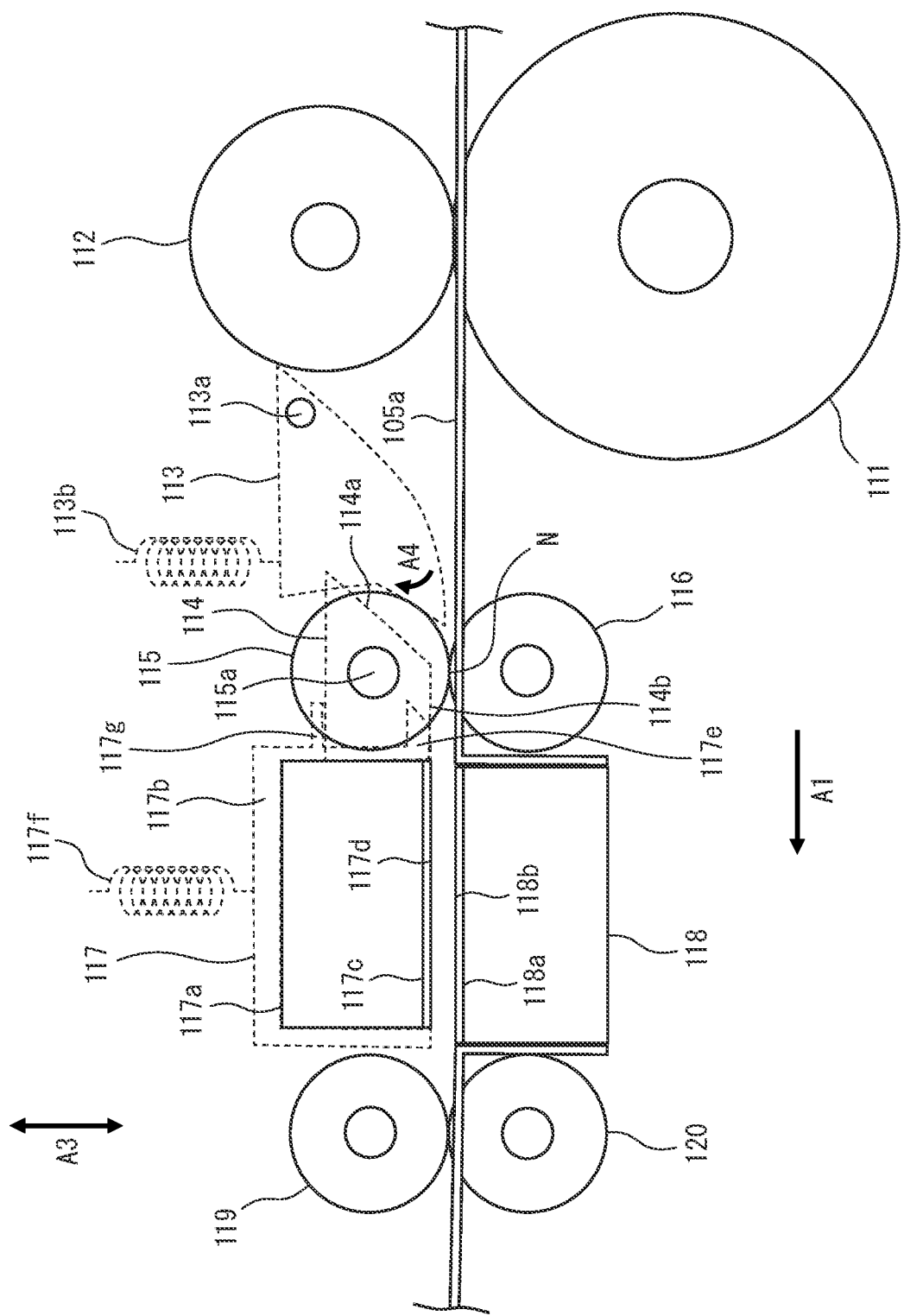
FIG. 3 is a schematic diagram for illustrating a conveyance guide 114, etc.

FIG. 3 is a schematic diagram for illustrating the flap guide 113, the conveyance guide 114 and the imaging unit guide 117b. FIG. 3 is a schematic diagram illustrating a portion between the feed roller 111 and the brake roller 112, and the first discharging roller 119 and the second discharging roller 120, as viewed from the side in the medium conveyance path.

As illustrated in FIG. 3, an upstream end portion 113a of the flap guide 113 is swingably supported in the upper housing 102. One end of a first spring 113b, the other end of which is supported in the upper housing 102, is attached to an upper end of a downstream end portion of the flap guide 113, and the downstream end portion of the flap guide 113 is urged in a direction toward the medium conveyance path side (downward) by the first spring 113b. In this manner, the flap guide 113 is provided swingably about an upstream end portion 113a in the medium conveying direction A1 as a center axis. Thus, the flap guide 113 regulates a floating of the front end of the medium without moving from the initial position when a medium that is not thick or rigid, such as a paper, is conveyed. On the other hand, the flap guide 113 regulates the upper surface of the medium while being pushed up by the conveyed medium when the medium having a thickness and rigidity, such as a thick paper, a plastic card, a passport or a booklet, is conveyed.

The conveyance guide 114 is provided on a first shaft 115a being a rotation axis of the first conveyance roller 115, to move in conjunction with a movement of the first conveyance roller 115. The first shaft 115a is an example of a rotation shaft. The conveyance guide 114 has an eaves shape, and has a first guide surface 114a and a second guide surface 114b.

The first guide surface 114a has a planar inclined surface inclined upward from the downstream side toward the upstream side. On the other hand, the second guide surface 114b is an example of a guide surface, and has a planar horizontal surface parallel to the lower guide 105a. A downstream end portion of the first guide surface 114a is connected to an upstream end portion of the second guide surface 114b.

In the medium conveying direction A1, an upstream end portion of the first guide surface 114a is located on the upstream side of a downstream end portion of a nip portion N of the first conveyance roller 115 and the second conveyance roller 116. Thus, when the front end of the conveyed medium floats, the first guide surface 114a can contact the front end of the medium, to satisfactorily guide the medium between the first imaging unit 117 and the second imaging unit 118. Preferably, in the medium conveying direction A1, the upstream end portion of the first guide surface 114a is located on the upstream side of the upstream end portion of the nip portion N of the first conveyance roller 115 and the second conveyance roller 116, more preferably, on the upstream side of an upstream end portion of the first conveyance roller 115. Thereby, when the front end of the conveyed medium floats, the first guide surface 114a can contact the front end of the medium, to satisfactorily guide the medium toward the nip position of the first conveyance roller 115 and the second conveyance roller 116.

In the medium conveying direction A1, the downstream end portion of the first guide surface 114a, i.e., the upstream end portion of the second guide surface 114b, is located on the upstream side of the downstream end portion of the nip portion N of the first conveyance roller 115 and the second conveyance roller 116. In the medium conveying direction A1, the downstream end portion of the first guide surface 114a may be located on the upstream side of the upstream end portion of the nip portion N of the first conveyance roller 115 and the second conveyance roller 116, or on the upstream side of the upstream end portion of the first conveyance roller 115. On the other hand, a downstream end portion of the second guide surface 114b is located on the downstream side of the upstream end portion of the first imaging unit 117, i.e., the upstream end portion of the imaging unit guide 117b. That is, the second guide surface 114b extends at least from the downstream end portion of the nip portion N of the first conveyance roller 115 and the second conveyance roller 116 to the upstream end portion of the first imaging unit 117 in the medium conveying direction A1. Thus, when the front end of the medium that has passed through the nip position of the first conveyance roller 115 and the second conveyance roller 116 floats, the second guide surface 114b can prevent the front end of the medium from entering the gap between the first conveyance roller 115 and the first imaging unit 117.

In the vertical direction A3 perpendicular to the conveying surface of the medium, the upstream end portion of the first guide surface 114a is located at a position apart from the lower guide 105a by a thickness of a medium having the maximum thickness supported by the medium conveying apparatus 100 or more. Thus, when a medium having a rigidity and a thickness is conveyed, the first guide surface 114a can reliably guide the medium between the first imaging unit 117 and the second imaging unit 118.

On the other hand, in the vertical direction A3, the downstream end portion of the first guide surface 114a is located at the same height as the lower surface 117d of the first imaging unit 117. That is, in the vertical direction A3, the second guide surface 114b is located at the same height as the lower surface 117d of the first imaging unit 117, and is located so as to be flush with the lower surface 117d of the first imaging unit 117. It should be note that "be flush with" includes, not only a state where a difference in positions in the vertical direction A3 is 0, but also a state where the difference is equal to or less than a predetermined difference. The predetermined difference is a tolerance allowed by the medium conveying apparatus 100, and is, for example, 0.2 mm. Thus, when the front end of the medium floats, the second guide surface 114b can suppress the front end of the medium from contacting a step between the second guide surface 114b and the lower surface 117d of the first imaging unit 117 to bend, and thereby suppress the occurrence of a jam, etc., of the medium.

The lower guide 105a is located so as to be flush with the upper surface 118b of the second imaging unit 118. That is, a distance between the second guide surface 114b and the lower guide 105a is substantially the same as a distance between the lower surface 117d of the first imaging unit 117 and the upper surface 118b of the second imaging unit 118. Thus, the lower guide 105a can suppress the front end of the medium from contacting a step between the lower guide 105a and the upper surface 118b of the second imaging unit 118 to bend, and thereby suppress the occurrence of a jam, etc., of the medium.

The imaging unit guide 117b is provided outside the imaging unit housing 117a, and contacts the conveyed medium to move the first imaging unit 117. The imaging unit guide 117b is formed of a member separate from the first imaging unit 117, and is provided integrally with the first imaging unit 117. The imaging unit guide 117b may be formed of a member integral with the first imaging unit 117. The imaging unit guide 117b includes a guide portion 117e. The guide portion 117e is provided so as to protrude toward the first conveyance roller 115 side (the upstream side). The guide portion 117e has an eaves shape, and has a planar inclined surface inclined upward from the downstream side toward the upstream side, and a planar horizontal surface parallel to the lower guide 105a. A downstream end portion of the inclined surface is connected with the upstream end portion of the horizontal surface. The horizontal surface is provided so as to be flush with the lower surface 117d of the first transmissive member 117c.

One end of a second spring 117f, the other end of which is supported in the upper housing 102, is attached to the upper surface of the imaging unit guide 117b, and the imaging unit guide 117b is urged in a direction toward the second imaging unit 118 side by the second spring 117f. Further, a convex portion (not shown) extending in the vertical direction A3 is formed at both ends in the width direction A2 of the imaging unit guide 117b. Each convex portion is engaged with a groove (not shown) extending in the vertical direction A3 in the upper housing 102.

The imaging unit guide 117b moves in the vertical direction A3 without inclining with respect to the conveying surface of the medium, by each convex portion provided at both ends of the imaging unit guide 117b moving along the groove formed in the upper housing 102. The first imaging unit 117 is provided to be movable in the vertical direction A3 perpendicular to the conveying surface of the medium, in conjunction with the movement of the imaging unit guide 117b. On the other hand, the second imaging unit 118 is fixed to the lower housing 101.

The imaging unit guide 117b is provided with an engagement portion 117g that can engage with a moving member described later, on the upstream side in the medium conveying direction A1 and above the guide portion 117e. The engagement portion 117g is an arm, and is formed of a member integral with the imaging unit guide 117b. The engagement portion 117g may be formed of a member separate from the imaging unit guide 117b.

Figure 4:
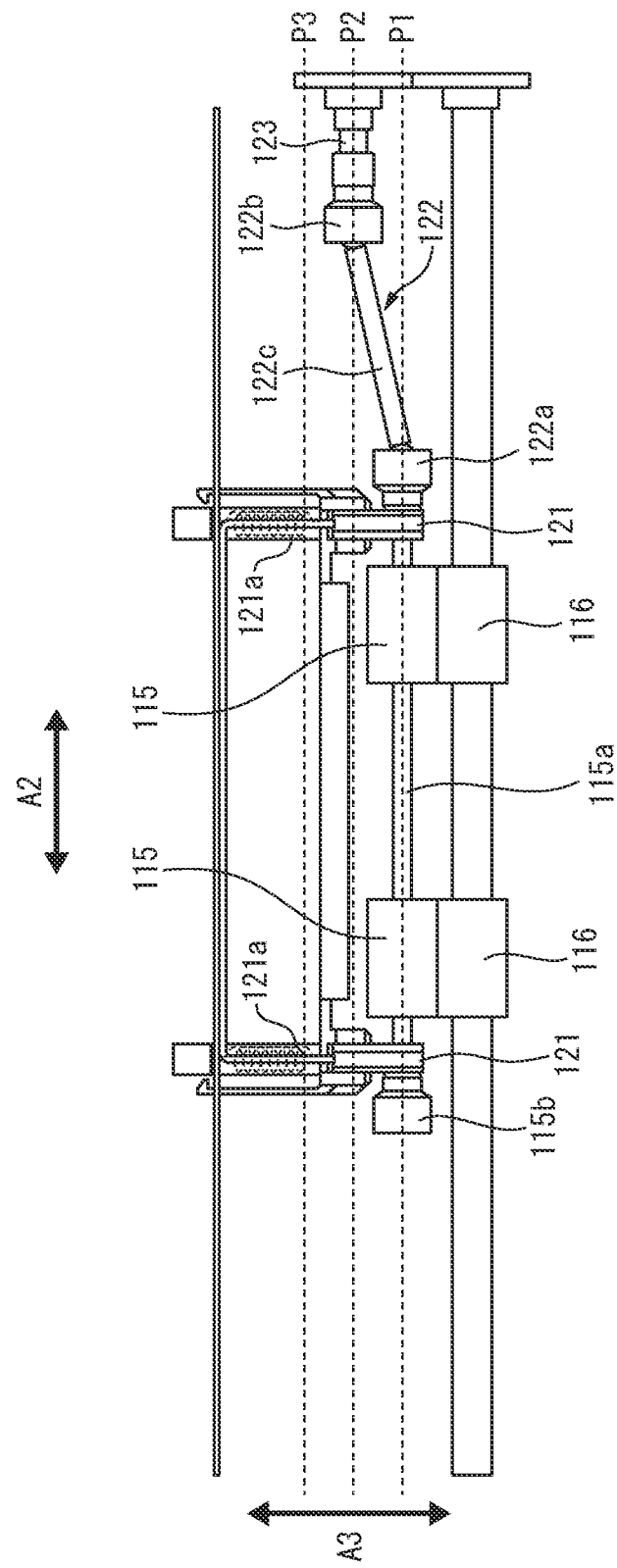
FIG. 4 is a schematic diagram for illustrating an arrangement of the first conveyance roller 115, etc.

FIG. 4 is a schematic diagram for illustrating a location of the first conveyance roller 115 and the second conveyance roller 116.

FIG. 4 is a schematic diagram of the first conveyance roller 115, the second conveyance roller 116, etc., as viewed from the upstream side in the medium conveying direction A1. As illustrated in FIG. 4, the medium conveying apparatus 100 further includes a moving member 121, a joint portion 122 and a second shaft 123, etc.

As described above, the first shaft 115a is the rotation axis of the first conveyance roller 115. The first conveyance roller 115 is provided on the first shaft 115a, and is rotated about the first shaft 115a by a driving device (not shown). One end 115b of the first shaft 115a engages with a groove (not shown) formed in the upper housing 102 and extending in the vertical direction A3. The first shaft 115a is provided to be movable in the vertical direction A3 perpendicular to the conveying surface of the medium in conjunction with a movement of the first conveyance roller 115.

The moving member 121 is provided on the first shaft 115a. One end of a third spring 121a, the other end of which is supported in the upper housing 102, is attached to the upper surface of the moving member 121, and the moving member 121, the first shaft 115a and the first conveyance roller 115 are urged in a direction toward the second conveyance roller 116 side by the third spring 121a. That is, the third spring 121a presses the first conveyance roller 115 toward the second conveyance roller 116 side.

Further, a groove (not shown) extending in the vertical direction A3 is formed in the moving member 121. Each groove is engaged with a plate member (not shown) fixed to the upper housing 102 and extending in the vertical direction A3. The moving member 121 moves in the vertical direction A3 without inclining with respect to the conveying surface of the medium, by each groove moving along the plate member. Thus, the first conveyance roller 115 and the first shaft 115a are provided to be movable in the vertical direction A3 perpendicular to the conveying surface of the medium according to a thickness of the conveyed medium. The moving member 121 is provided to be movable in conjunction with the movement of the first conveyance roller 115 and the first shaft 115a. On the other hand, the second conveyance roller 116 is fixed to the lower housing 101.

The joint portion 122 is a universal joint, and includes a first receiving member 122a, a second receiving member 122b and a joint shaft 122c. The first receiving member 122a is provided so as to be fixed to an end portion opposite to the end portion 115b of the first shaft 115a, and is connected to the first shaft 115a. The second receiving member 122b is provided so as to be fixed to one end of the second shaft 123, and is connected to the second shaft 123. The joint shaft 122c connects the first receiving member 122a and the second receiving member 122b. Thereby, the joint portion 122 connects the first shaft 115a and the second shaft 123 so as to be tiltable, and transmits a rotation driving force from the second shaft 123 to the first shaft 115a.

The second shaft 123 is a drive axis rotated by the driving device. One end of the second shaft 123 is connected to the second receiving member 122b, and the other end of the second shaft 123 is connected to the drive device via a drive mechanism (not shown). Thus, the second shaft 123 transmits a rotation driving force from the driving device to the joint portion 122, and the first conveyance roller 115 is rotated by the driving device.

The second shaft 123 is located at a position P2 above the position P1 where the first conveyance roller 115 contacts the second conveyance roller 116, in the vertical direction A3. The position P1 is a center position of the first conveyance roller 115 when contacting the second conveyance roller 116. The position P2 is a center position of the second shaft 123. The first receiving member 122a is located at the position P1 and the second receiving member 122b is located at the position P2 in the vertical direction A3, in a state where the medium is not conveyed. Thereby, the joint shaft 122c is located in a tilted manner in such a way as to rise from the central side to the outside in the width direction A2. The initial position P1 of the first conveyance roller 115 is located below the center position P2 of the second shaft 123, thus the first conveyance roller 115 can move upward from the position P2 to an upper position P3 which is apart from the position P2 by a distance between the position P1 and the position P2. Therefore, the medium conveying apparatus 100 can increase a moving range of the first conveyance roller 115.

The arrangement relationship of the first ejection roller 119 and the second ejection roller 120 is substantially the same as the arrangement relationship of the first conveyance roller 115 and the second conveyance roller 116. That is, the medium conveying apparatus 100 includes a joint portion, a shaft and a moving member for moving the first ejection roller 119. The first ejection roller 119 is provided to be movable in the vertical direction A3 perpendicular to the conveying surface. On the other hand, the second ejection roller 120 is fixed to the lower housing 101.

Figure 5A:
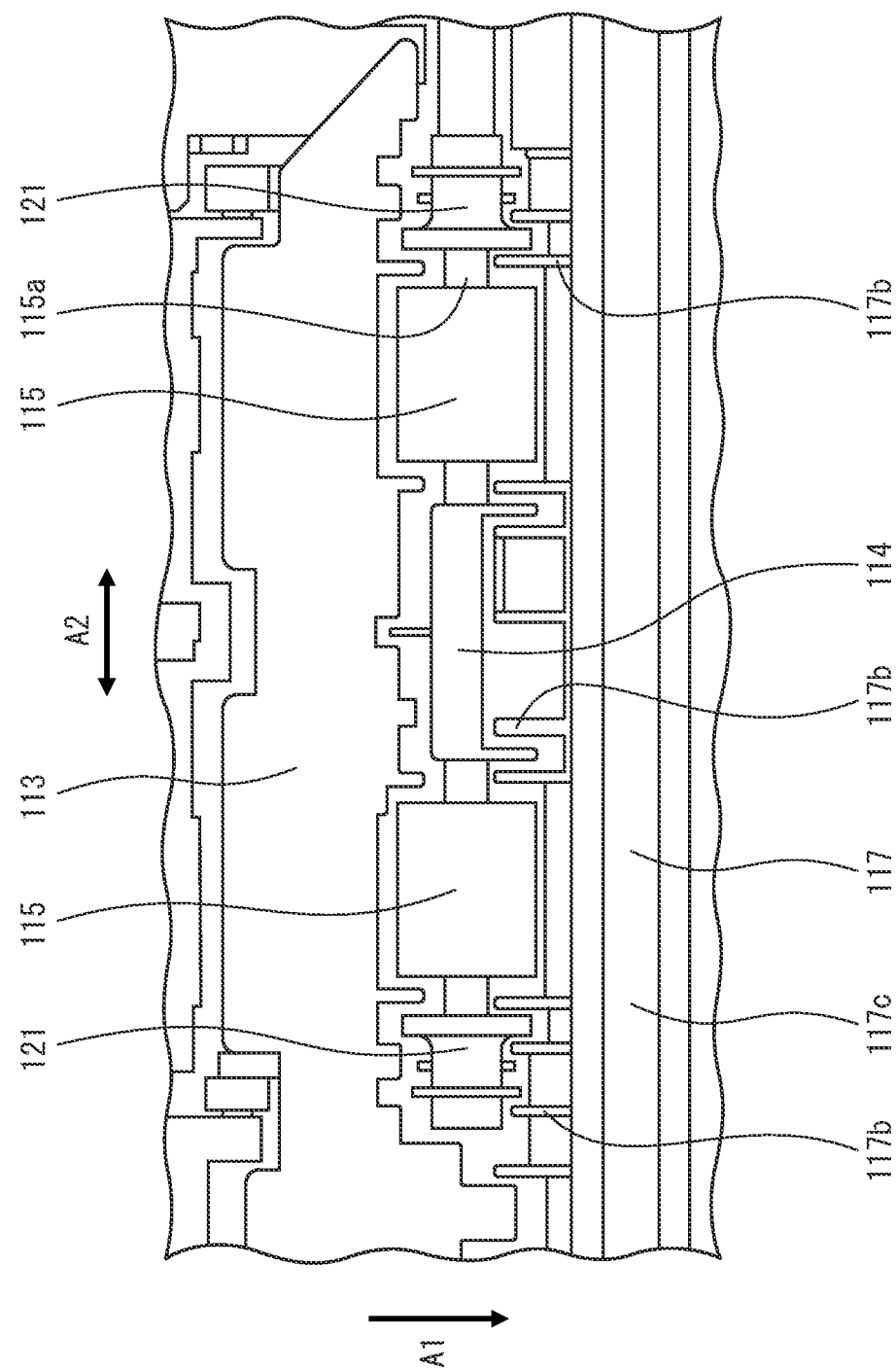
FIG. 5A is a schematic diagram for illustrating a positional relation of the conveyance guide 114, etc.
Figure 5B:
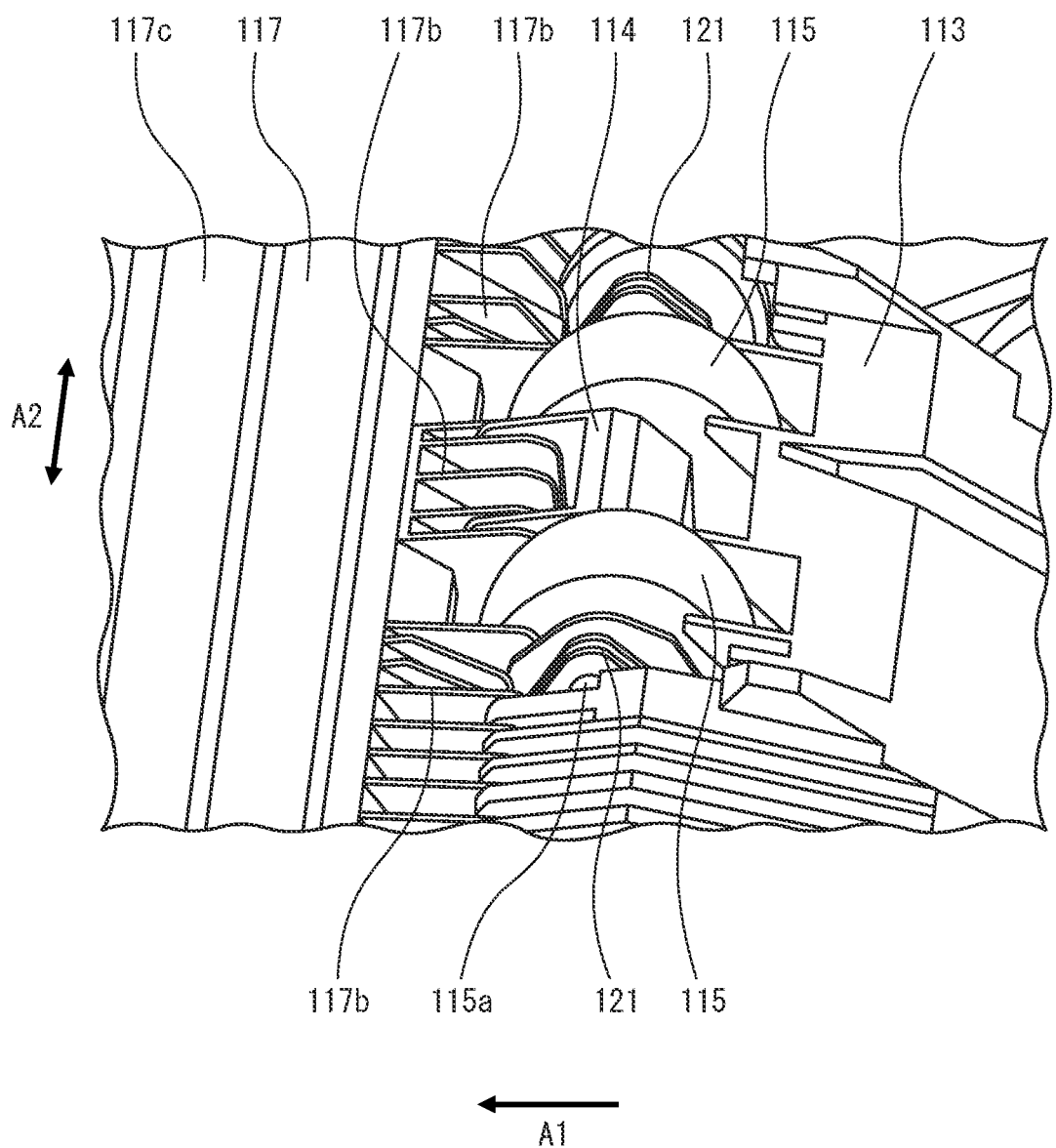
FIG. 5B is a schematic diagram for illustrating the positional relation of the conveyance guide 114, etc.

FIGS. 5A and 5B are schematic diagrams for illustrating a positional relation between the flap guide 113, the conveyance guide 114, the first conveyance roller 115 and the imaging unit guide 117b. FIG. 5A is a plan view of the flap guide 113, the conveyance guide 114, the first conveyance roller 115 and the imaging unit guide 117b, as viewed from the lower side. FIG. 5B is a perspective view of the flap guide 113, the conveyance guide 114, the first conveyance roller 115 and the imaging unit guide 117b, as viewed from the lower side.

As illustrated in FIGS. 5A and 5B, the flap guide 113 is provided so as to extend over the outer end portion of the two first conveyance rollers 115 in the width direction A2. The number of the flap guide 113 is not limited to one, a plurality of flap guides 113 may be located apart from each other alongside in the width direction A2.

The conveyance guide 114 is located between the two first conveyance rollers 115 in the width direction A2. The number of the conveyance guide 114 is not limited to one, a plurality of conveyance guides 114 may be located apart from each other alongside in the width direction A2. In that case, the conveyance guide 114 may be located outside the two first conveyance roller 115 in the width direction A2.

The imaging unit guide 117b is located between the two first conveyance roller 115 and outside the two first conveyance roller 115 in the width direction A2. The number of the conveyance guide 114 is not limited to three, and may be one, two or four or more.

The flap guide 113, the conveyance guide 114, the imaging unit guide 117b and the first conveyance roller 115 are located at in such a way as not to face each other. In particular, the second guide surface 114b of the conveyance guide 114 and the guide portion 117e of the imaging unit guide 117b have a comb-teeth shape, respectively. The second guide surface 114b of the conveyance guide 114 and the guide portion 117e of the imaging unit guide 117b are provided so as to overlap each other in the medium conveyance direction A1, and are provided so that one is located at a notched portion of the other in the width direction A2. The second guide surface 114b of the conveyance guide 114 and the horizontal surface of the guide portion 117e of the imaging unit guide 117b are located so as to be flush with each other. Thus, the imaging unit guide 117b can reliably and satisfactorily guide the medium guided by the conveyance guide 114 between the first imaging unit 117 and the second imaging unit 118.

Figure 6A:
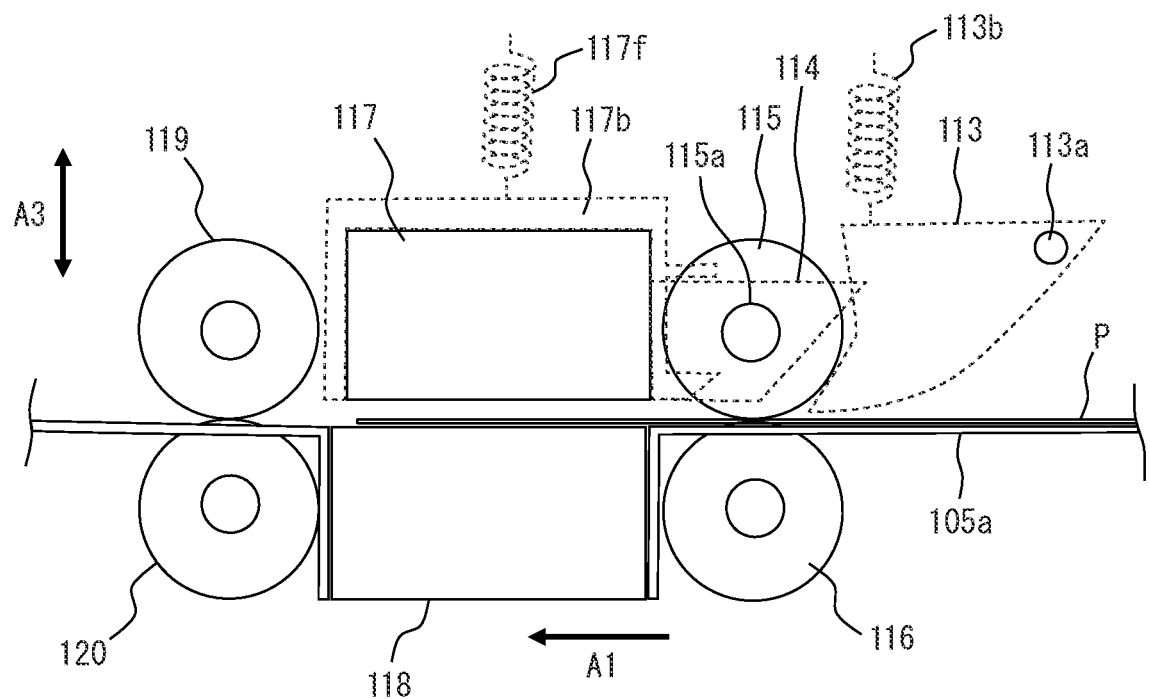
FIG. 6A is a schematic diagram for illustrating operations of the conveyance guide 114, etc.
Figure 6B:
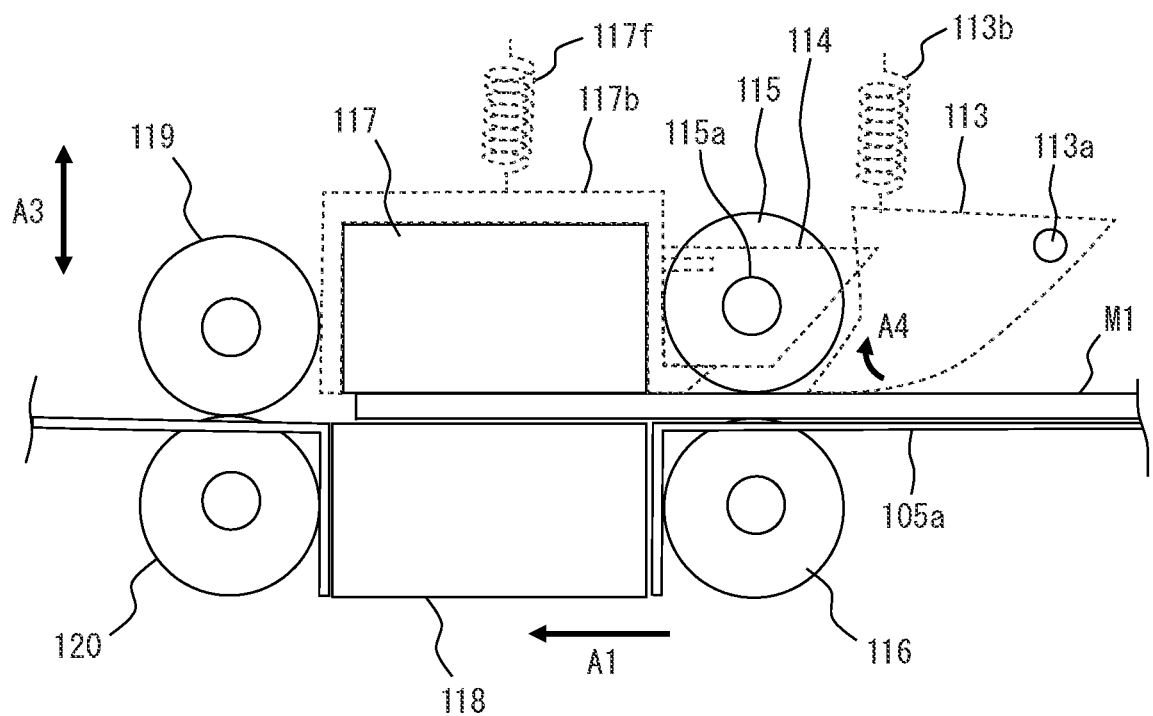
FIG. 6B is a schematic diagram for illustrating the operations of the conveyance guide 114, etc.

FIGS. 6A and 6B are schematic diagrams for illustrating operations of the flap guide 113, the conveyance guide 114 and the imaging unit guide 117b when conveying the medium. FIGS. 6A and 6B are views of the flap guide 113, the conveyance guide 114 and the imaging unit guide 117b, etc., as viewed from the side.

FIG. 6A illustrates an example in which a paper P that is not thick or rigid is conveyed, as a medium. The thickness of the paper P is smaller than a distance between the lower end of the flap guide 113, the conveyance guide 114 and the imaging unit guide 117b, and the lower guide 105a in the vertical direction A3. As illustrated in FIG. 6A, when the paper P is conveyed, the flap guide 113, the conveyance guide 114 and the imaging unit guide 117b do not contact the paper P and do not move. However, when the paper P floats during conveyance, the floated portion contacts the flap guide 113, the conveyance guide 114 or the imaging unit guide 117b, to be pressed by the flap guide 113, the conveyance guide 114 or the imaging unit guide 117b. Thus, the flap guide 113, the conveyance guide 114 and the imaging unit guide 117b regulates the floating of the medium when the medium that is not thick or rigid is conveyed. Thus, the medium conveying apparatus 100 can suppress the occurrence of the jam of the medium.

FIG. 6B illustrates an example in which a medium M1 having a thickness and rigidity, such as a thick paper, a plastic card, a passport or a booklet, is conveyed, as a medium. The thickness of the medium M1 is larger than the distance between the lower end of the flap guide 113, the conveyance guide 114 and the imaging unit guide 117b, and the lower guide 105a in the vertical direction A3. As illustrated in FIG. 6B, when the medium M1 is conveyed, the flap guide 113 is pushed up by the medium M1 to move upward. The first conveyance roller 115 is also pushed up by the medium M1 to move upward. As the first conveyance roller 115 moves, the first shaft 115a and the conveyance guide 114 move upward, so that the medium M1 does not contact the conveyance guide 114. The imaging unit guide 117b is pushed up by the medium M1 to move upward, and the first imaging unit 117 also moves upward as the imaging unit guide 117b moves. Thus, the flap guide 113 and the imaging unit guide 117b regulates the upper surface of the medium when the medium having a thickness and rigidity is conveyed. Thus, the medium conveying apparatus 100 can satisfactorily convey medium having a thickness and rigidity.

FIGS. 7A, 7B, 8A and 8B are schematic diagrams for illustrating operations of the first conveyance roller 115, the moving member 121 and the imaging unit guide 117b when conveying the medium. FIGS. 7A, 7B, 8A and 8B are views of the first conveyance roller 115, the moving member 121 and the imaging unit guide 117b, etc., as viewed from the side.

As illustrated in FIGS. 7A, 7B, 8A and 8B, the moving member 121 is provided with an engaged portion 121b so as to be engaged with the engaging portion 117g of the imaging unit guide 117b.

FIGS. 7A, 7B, 8A and 8B illustrate an example in which a medium M2 having a thickness and rigidity, such as a cardboard, a plastic card, a passport or a brochure, is conveyed, as a medium. The thickness of the medium M2 is larger than a distance between the upper end of the inclined surface of the guide portion 117e of the imaging unit guide 117b, and the lower guide 105a in the vertical direction A3, and is smaller than a distance between the rotation center of the second conveyance roller 116, and the lower guide 105a.

Figure 7A:
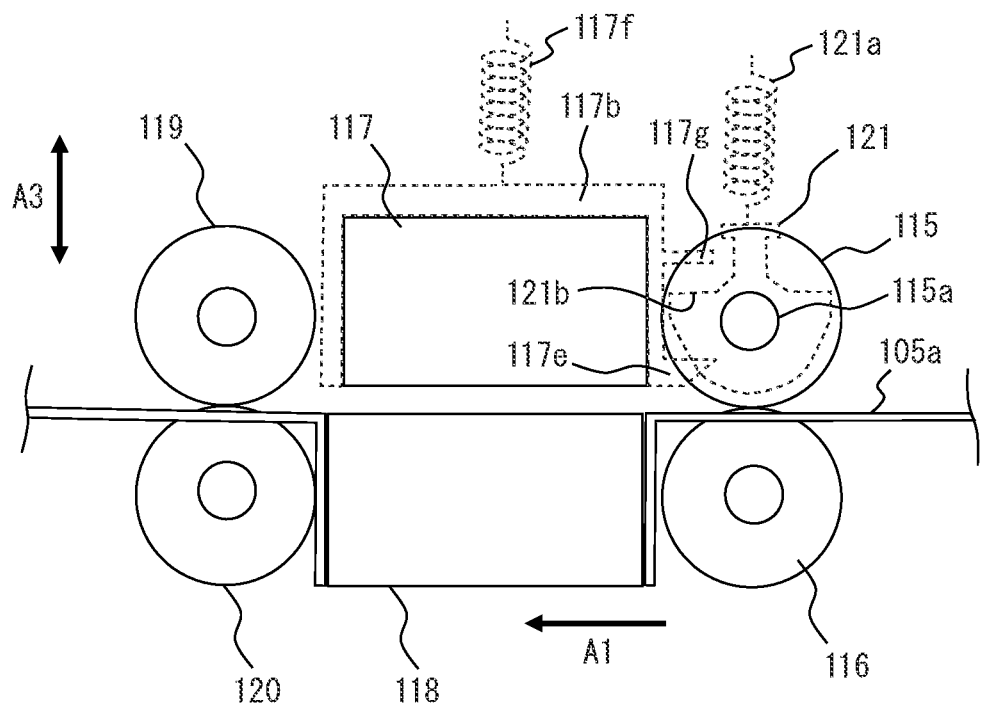
FIG. 7A is a schematic diagram for illustrating operations of the moving member 121, etc.

FIG. 7A illustrates a state in which a medium is not conveyed. As illustrated in FIG. 7A, when the medium is not conveyed, the first conveyance roller 115 contacts the second conveyance roller 116. The imaging unit guide 117b supports the first imaging unit 117 so that a slight gap for conveying a thin medium exists between the first imaging unit 117 and the second imaging unit 118. The gap between the first imaging unit 117 and the second imaging unit 118 is set to, for example, 0.5 mm or more and 1.0 mm or less.

The inclined surface of the guide portion 117e is located so that the distance between the upper end of the inclined surface and the lower guide 105a is shorter than the distance between the rotation center of the first conveyance roller 115 and the lower guide 105a in the vertical direction A3 when a medium is not conveyed. When a medium is not conveyed, the engaging portion 117g of the imaging unit guide 117b and the engaged portion 121b of the moving member 121 are located apart from each other. The engaging portion 117g is located so that a distance (space) between the engaging portion 117g and the engaged portion 121b is shorter than the distance between the upper end of the inclined surface and the lower guide 105a in the vertical direction A3 when a medium is not conveyed. The distance between the engaging portion 117g and the engaged portion 121b when the medium is not conveyed, is set to, for example, 0.5 mm or more and 1.0 mm or less.

Figure 7B:
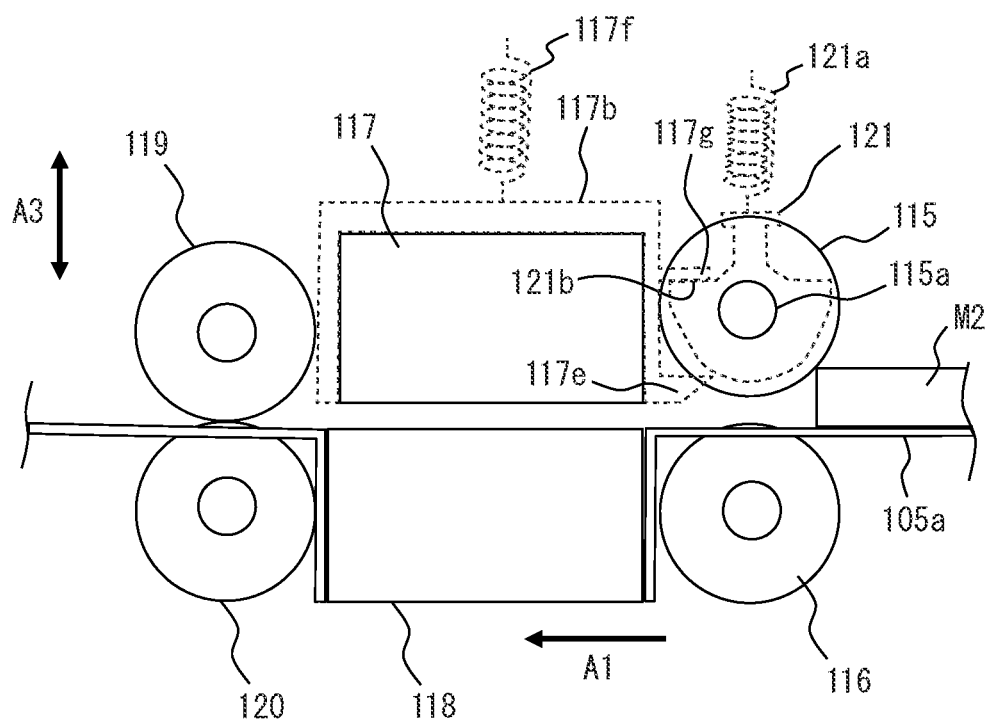
FIG. 7B is a schematic diagram for illustrating the operations of the moving member 121, etc.

FIG. 7B illustrates a state where the medium M2 is conveyed, and the front end of the medium M2 contacts the first conveyance rollers 115. As illustrated in FIG. 7B, when the front end of the medium M2 contacts the first conveyance roller 115, the first conveyance roller 115 is moved (pushed up) upward, i.e., in a direction away from the lower guide 105a in the vertical direction A3 by the medium M2. The moving member 121 moves in conjunction with the movement of the first conveyance roller 115, and the engaged portion 121b of the moving member 121 engages with the engaging portion 117g.

Figure 8A:
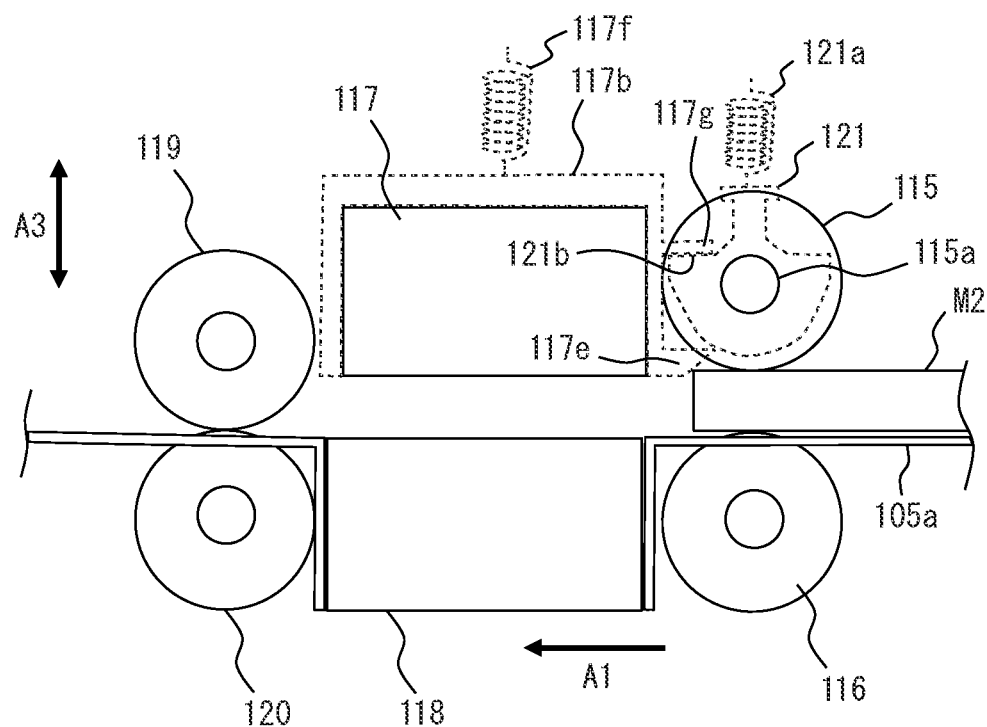
FIG. 8A is a schematic diagram for illustrating the operations of the moving member 121, etc.

FIG. 8A illustrates a state where the medium M2 is further conveyed and the front end of the medium M2 contacts the inclined surface of the guide portion 117e of the imaging unit guide 117b. As illustrated in FIG. 8A, when the medium M2 is further conveyed after the front end of the medium M2 contacts the first conveyance roller 115, the first conveyance roller 115 is further moved upward by the medium M2, and the moving member 121 is further moved upward in conjunction with the movement of the second conveyance roller 116. The engaging portion 117g engaged with the engaged portion 121b of the moving member 121 is moved upward by the moving member 121, thus the imaging unit guide 117b moves upward and the front end of the medium M2 can contact the inclined surface of the guide portion 117e. Thus, it is suppressed that the front end of the medium M2 collides with the upstream end of the imaging unit guide 117b in the medium conveying direction A1, to stop the medium M2, and to cause the jam.

Further, as the imaging unit guide 117b moves upward, the first imaging unit 117 moves upward. In this manner, the moving member 121 engages with the imaging unit guide 117b to move the first imaging unit 117 upward in the vertical direction A3.

Figure 8B:
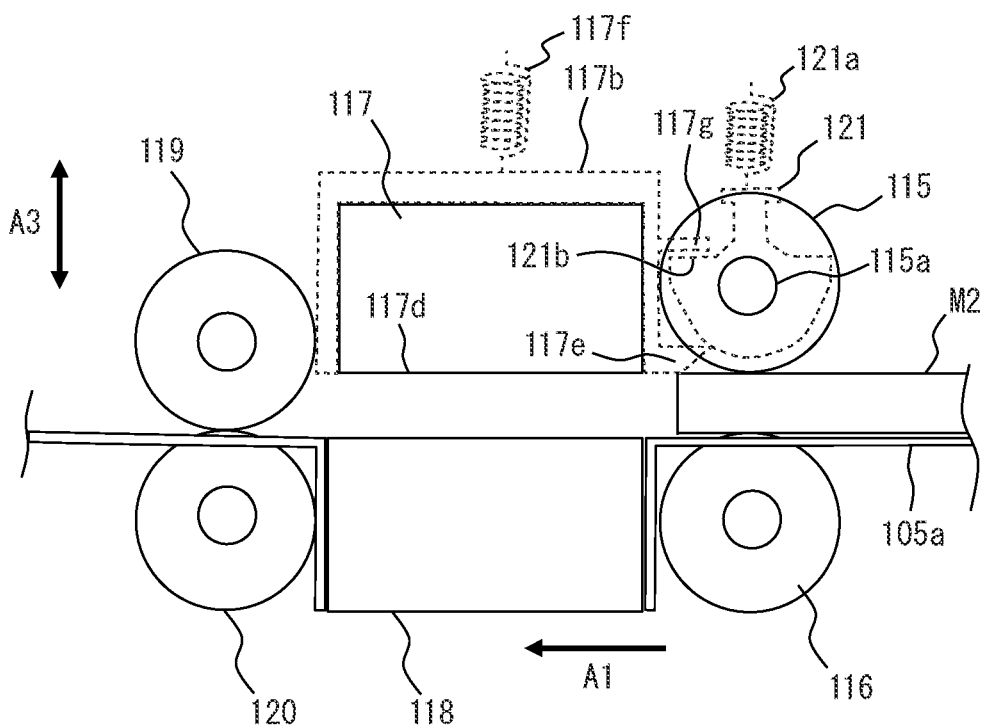
FIG. 8B is a schematic diagram for illustrating the operations of the moving member 121, etc.

FIG. 8B illustrates a state where the medium M2 is further conveyed, and the front end of the medium M2 contacts the lower end of the inclined surface of the guiding portion 117e, which is positioned at the same height as the lower surface 117d of the first imaging unit 117. As illustrated in FIG. 8B, when the medium M2 is further conveyed after the front end of the medium M2 contacts the inclined surface of the guide portion 117e, the imaging unit guide 117b moves further upward by the medium M2, and accordingly, the first imaging unit 117 moves further upward. Thus, the medium M2 is appropriately conveyed between the first imaging unit 117 and the second imaging unit 118.

In this manner, the imaging unit guide 117b moves the first imaging unit 117 upward in the vertical direction A3, by the medium M2 contacting the inclined surface. On the other hand, since the first conveyance roller 115 is not moved from the position shown in FIG. 8A at this time, the engaging portion 117g is separated again from the engaged portion 121b of the moving member 121.

As described above, when a medium is not conveyed, the engaging portion 117g of the imaging unit guide 117b and the engaged portion 121b of the moving member 121 are located apart from each other. Therefore, when a medium thinner than a distance between the engaging portion 117g and the engaged portion 121b when a medium is not conveyed, is conveyed, the engaged portion 121b does not engage with the engaging portion 117g, and the moving member 121 does not move the engaging portion 117g and the first imaging unit 117. In this manner, the moving member 121 engages with the imaging unit guide 117b to move the first imaging unit 117 only when a medium having a predetermined thickness or more is conveyed.

In particular, the medium conveying apparatus 100 raises the first imaging unit 117 in two stages: when the medium comes into contact with first conveyance roller 115 and when the medium comes into contact with the inclined surface of the imaging unit guide 117b. Since the medium conveying apparatus 100 does not need to increase an inclination of the inclined surface of the imaging unit guide 117b, the medium conveying apparatus 100 can suppress the occurrence of the jam of the medium. Further, since the medium conveying apparatus 100 does not need to increase a size of the inclined surface of the imaging unit guide 117b, the medium conveying apparatus 100 can suppress increase in a size of the entire medium conveying apparatus 100.

That is, in the medium conveying apparatus 100, the moving member 121 engages with the engaging portion 117g in conjunction with the movement of the first conveyance roller 115, to move the imaging unit guide 117b and the first imaging unit 117 when a medium having a predetermined thickness or more is conveyed. Thus, the medium conveying apparatus 100 can appropriately move the first imaging unit 117, to satisfactorily image the conveyed media, when the media having various thicknesses are conveyed.

As described in detail above, in the medium conveying apparatus 100, the conveyance guide 114 is provided on the rotation axis of the first conveyance roller 115. The conveyance guide 114 is provided so that the second guide surface 114b extends from the downstream end portion of the nip portion N of the first conveyance roller 115 and the second conveyance roller 116 to the upstream end portion of the first imaging unit 117, and is provided so as to be flush with the lower surface 117d of the first imaging unit 117. Thus, the medium conveying apparatus 100 can appropriately convey the medium to the first imaging unit 117 which is movably provided. Thus, the medium conveying apparatus 100 can appropriately convey the media having various thicknesses.

In particular, in the medium conveying apparatus 100, the first conveyance roller 115 is provided to be movable in the vertical direction A3, the conveyance guide 114 moves in conjunction with the movement of the first conveyance roller 115. Thus, the medium conveying apparatus 100 can appropriately convey a thick medium such as a passport, and suppress the occurrence of the jam by regulating the floating of the thin paper when conveying the thin paper.

The second guide surface 114b of the conveyance guide 114 is provided so as to be flush with the lower surface 117d of the first imaging unit 117. Thus, the medium conveying apparatus 100 can suppress the occurrence of the jam when conveying the medium from an upstream side area having a large gap in the vertical direction A3 to a region between the first imaging unit 117 and the second imaging unit 118 having a small gap in the vertical direction A3, in the medium conveyance path.

Incidentally, the flap guide 113 may not be swingably provided, and may be provided fixedly. Alternatively, the flap guide 113 may be omitted. Further, the imaging unit guide 117b may be omitted. In that case, a recess where the front end of the conveyance guide 114 is located, is provided at a position facing the conveyance guide 114 in the first imaging unit 117, in the width direction A2. Thus, the conveyance guide 114 is provided so as to extend to the upstream end of the first imaging unit in the medium conveying direction A1.

According to the embodiment, the medium conveying apparatus can appropriately convey the medium to the imaging unit which is movably provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A medium conveying apparatus comprising:
    an imaging device, including an imaging sensor, movable in a direction perpendicular to a conveying surface for conveying a medium, to image the medium;
    a plurality of rollers on an upstream side of the imaging device in a medium conveying direction, and movable in a direction perpendicular to the conveying surface; and
    a conveyance guide for guiding the conveyance of the medium that moves in conjunction with a movement of the plurality of rollers by contacting a rotation axis of the plurality of rollers, wherein
    the conveyance guide is located between the plurality of rollers and includes a guide surface inclined upward from a downstream side toward an upstream side in the medium conveying direction, and wherein
    the guide surface is located on an upstream side of a rotation center of the plurality of rollers in the medium conveying direction.

2. The medium conveying apparatus according to claim 1, wherein the imaging device includes a second conveyance guide to contact the medium to move the imaging device.

3. The medium conveying apparatus according to claim 2, further comprising a moving member to move in conjunction with the movement of the plurality of rollers and engage with the second conveyance guide, to move the imaging device, wherein
    the second conveyance guide and the moving member are located apart from each other when a medium is not conveyed, and the moving member engages with the second conveyance guide to move the imaging device only when a medium having a predetermined thickness or more is conveyed.

4. The medium conveying apparatus according to claim 1, further comprising a third conveyance guide located on an upstream side of the conveyance guide in the medium conveying direction, and provided swingably about an upstream end portion in the medium conveying direction as a center axis.

5. The medium conveying apparatus according to claim 1, wherein
    the plurality of rollers are located apart from each other in a direction perpendicular to the medium conveying direction, and wherein
    the conveyance guide is between the plurality of rollers in the direction perpendicular to the medium conveying direction.

6. The medium conveying apparatus according to claim 1, wherein the conveyance guide further includes a second guide surface parallel to a lower surface of the imaging device.

* * * * *